United States Patent [19]
Cundall

[11] Patent Number: 5,385,002
[45] Date of Patent: Jan. 31, 1995

[54] SHEATHING APPARATUS

[75] Inventor: David J. Cundall, Doncaster, Great Britain

[73] Assignee: Ag-Bag Corporation, Warrenton, Oreg.

[21] Appl. No.: 127,443

[22] PCT Filed: Nov. 23, 1990

[86] PCT No.: PCT/GB90/01820

§ 371 Date: Nov. 29, 1991

§ 102(e) Date: Nov. 29, 1991

[87] PCT Pub. No.: WO91/07867

PCT Pub. Date: Jun. 13, 1991

Related U.S. Application Data

[63] Continuation of Ser. No. 730,776, Nov. 29, 1991, abandoned.

[51] Int. Cl.[6] .................................................. B65B 43/26
[52] U.S. Cl. ............................................ 53/441; 53/459; 53/556; 53/567; 53/576
[58] Field of Search ................ 53/441, 459, 556, 567, 53/576, 585

[56] References Cited

U.S. PATENT DOCUMENTS

| | | | |
|---|---|---|---|
| 2,033,238 | 3/1936 | Geyer et al. | 53/441 X |
| 2,982,068 | 5/1961 | Pape | 53/567 |
| 3,563,002 | 2/1971 | Givin | 53/567 |
| 3,879,918 | 4/1975 | Lerner | 53/441 |
| 3,902,303 | 9/1975 | King | 53/567 |
| 4,050,219 | 9/1977 | Higgins | 53/567 |
| 4,165,595 | 8/1979 | Pilley | 53/567 X |
| 4,470,241 | 9/1984 | Parry | 53/585 X |
| 4,594,836 | 6/1986 | Good | 53/459 |
| 4,606,176 | 8/1986 | Cundall | 53/567 |
| 4,686,817 | 8/1987 | Brodrecht et al. | 53/567 |
| 4,771,510 | 9/1988 | Kawai | 53/567 X |
| 4,793,124 | 12/1988 | Anderson | 53/556 X |
| 4,888,937 | 12/1989 | Glenn | 53/459 X |
| 4,938,006 | 7/1990 | Korsgaard | 53/459 X |
| 4,945,715 | 8/1990 | Brodrecht | 53/567 |
| 5,003,754 | 4/1991 | Stirling | 53/459 |
| 5,016,424 | 5/1991 | Stirling | 53/567 X |

FOREIGN PATENT DOCUMENTS 2070549  9/1981  United Kingdom .

Primary Examiner—John Sipos
Assistant Examiner—Daniel B. Moon
Attorney, Agent, or Firm—Robert L. Harrington

[57] ABSTRACT

Baled material (4) is fed into a resilient sheath (4) through an open end thereof with at least the open end portion held in a resiliently expanded condition so that after insertion of the material the sheath can contract around the material, so expelling excess air. The sheath is held by a holding device having members (25; 124) movable on cranks between positions in which the sheath can be readily located on the members in its unstressed condition and in which at least the open end of the sheath is enlarged by stretching.

8 Claims, 3 Drawing Sheets

SHEATHING APPARATUS

This is a continuation of copending application(s) Ser. No. 07/730,776 filed on Nov. 29, 1991 abandoned.

The present invention relates to a method of and an apparatus for placing material, for example, straw, grass, hay or silage, which may, but need not be formed into bales, within a tubular sheath.

There is known from GB 2 136 761 A, a bale-sheathing device comprising a mobile sheath-carrying structure arranged to support and hold open an axially closed-up portion of a tubular sheath in a manner enabling said closed-up portion to be progressively pulled out rearwardly off the sheath-carrying structure, and bale lifting and guide means carried by the mobile sheath-carrying structure and arranged to lift up a bale to be sheathed and guide it through the closed-up portion of the sheath as the device is advanced relative to the bale, the device being so arranged that after passage through the closed-up portion of the sheath, the bale is put down again whereby, in use of the device, the bale comes to rest within an axially opened-out part of the sheath pulled out off the structure during advance of the device.

It was proposed in GB 2 136 761 A that this device be used to sheath bales within tubular plastic sheaths of greater diameter than the bales. Thus, for example, tubular plastics sheaths of 2 m diameter and up to 80 m in length were proposed to be used for containing large round bales of up to 1.8 m in diameter.

It has however now been appreciated that the relatively large volume of air necessarily contained within a plastics sheath of this dimensional relationship with the baled material can promote undesired fermentation. Also, the slack portions of the sheath are liable to be snagged and torn. The present invention is thus concerned with the provision of a sheathing method and apparatus by which these disadvantages may be overcome.

The present invention accordingly provides a method of and an apparatus for sheathing material in which the material is fed into a resilient sheath through an open end thereof with at least the open end portion of the sheath held in a resiliently expanded condition so that after insertion of the material the sheath can contract around the material, so expelling excess air.

The sheath can thus be held during insertion of the material by a holding device having a first position in which the sheath can be readily located on the device in its unstressed condition. The device can then be operated so as to enlarge at least the open end of the sheath by stretching of the resilient plastics sheet of which it is constructed.

The holding device can comprise a plurality of cranks spaced around the periphery of a support ring, the cranks having mounting portions journalled on the ring about axes parallel to the ring axis and axially offset parallel support portions extending away from the ring in the direction in which the material is to be loaded into the sheath. Initially, the cranks are positioned so that the support portions are all located at their innermost positions. The sheath has a diameter in its relaxed condition which is intermediate between that of the ring and that of the circle on which the crank second portions initially lie, so the sheath can be readily placed on the cranks. Rotation of the cranks on the support ring effects movement of the support portions outwardly to positions adjacent the support ring periphery, so this movement stretches the sheath side wall so that the sheath has an open end of a cross-section approximating to that of the support ring.

The rotation of the mounting portions of the cranks about their axes can be effected by any suitable common drive mechanism. For example, the cranks may be mechanically linked by a linkage acted upon by an hydraulic ram. Alternatively, the mounting portions could be rotated by rotation of an outer ring to which the cranks are in driven relationship by means of gear teeth on the outer ring and meshing with gear teeth on the mounting portions.

In the stretched condition of the sheath, the material to be sheathed, preferably but not necessarily in the form of bales, can enter the stretched sheath through the support ring by appropriate relative movement of material and the apparatus. The support ring can thus be carried by a frame which can be connected to a powered vehicle, for example, a tractor, so as to be driven over a field so as to move into the sheath baled material awaiting sheathing.

Any convenient equipment can be used to effect filling of the sheath with the material to be enclosed, for example, the bale lifting and guiding means disclosed in GB 2 136 761 A where the material is available in baled form. Blades or wheels or rollers can thus be provided to engage underneath the material and also to engage its sides if in baled form, so as to guide the material into the sheath. A conveyor for example a passive belt conveyor can be employed instead or in addition to such guide means.

Preferably the sheath is initially contracted lengthwise, as by being bunched, convoluted or formed with bellows-like folds as taught in GB 2 136 761 A. When feeding in of the material begins, by relative movement of the material and the sheath and its holding device, the sheath is then extended lengthwise off the holding device by the incoming material so as to contract resiliently around it. The sheath can be a blown film of plastics material capable of being stretched in respect of its circumference by about 25%. Because of its plastics memory the sheath will shrink back to about 5% extension within 30 minutes of release with a further contraction over the next 24 hours.

The present invention thus provides for the enclosure in a plastics sheath of straw, hay or silage material, for example, in a convenient and efficient way, by use of simple apparatus. The material is compactly ensheathed without undue free air space within the sheath, so that undesired fermentation is restricted or eliminated. The material is sheathed in such a way that the sheath is resistant to being split or torn, and because of the tight fit of the material within the sheath, a minimal quantity of sheathing material is employed.

The invention is further described below, by way of example, with reference to the accompanying drawings, in which.

The illustrated apparatus 1 is particularly suitable for enclosing large generally cylindrical bales of for example 1.22 meters (48 inches) in diameter in a tubular sheath of resiliently stretchable plastics material having a rather smaller unstretched diameter for example 1.14 meters (45 inches) in its relaxed or unstretched condition.

Figure 2:
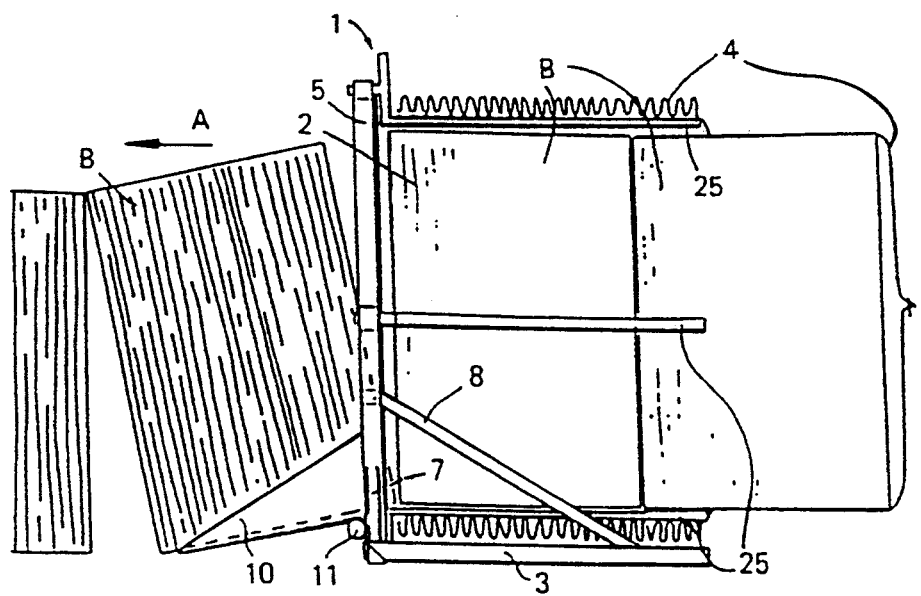
FIG. 2 is a sectional side view of the apparatus of FIG. 1 in use and with parts omitted.

The apparatus 1 comprises a movable sheath support structure mounted on two ground engaging skids 3. The support ring structure includes a rigid metal ring 5 defining an entry mouth 6 large enough to allow the passage therethrough of the large round bales of about 1.22 meters in diameter with limited but adequate clearance. The ring 5 mounts around its periphery sheath holding or support means, described in detail below, capable of holding at least an open end portion of a tubular plastics sheath 4 of resiliently stretchable material with the open end portion stretched open from a relaxed or unstressed condition, so as to correspond at least approximately in cross-section to that of the mouth 6. The sheath 4 is held on the holding or support means in a condition in which it is not only stretched open but in which it is also axially closed up or contracted as by being concertinered or otherwise provided with peripheral folds so as to considerably shorten its axial length, as indicated in FIG. 2. Initially, the shortened axial length can be little more than the length of the support means even with a sheath of some 61 m. (200 feet) length.

Each skid 3 is rigidly connected to the ring 5 by means of a respective leg 7 and strut 8. The skids 3 are arranged to support the support structure at a height off the ground sufficient to ensure that the gap beneath the bottom of the structure and the ground is large enough to prevent the stretched, bunched-up, sheath on the structure, dragging on the ground upon advance of the apparatus on the skids. In practice, the gap between the support structure and ground is of the order of 0.18 m (7 inches).

The apparatus 1 includes means arranged to lift a bale B off the ground and to guide it into the mouth 6 of the support structure. These comprise a pair of blades 10 which project downwardly from the ring 5 and forwardly in the intended direction of advance A of the apparatus. The shape and disposition of the blades 10 is such that upon advance of the apparatus towards a bale B, the blades engage beneath and on respective sides of the bale B and progressively lift it into the mouth. A roller 11 carried by the ring 5 at the bottom of the mouth facilitates the transfer of the bale B from the blades 10 into the interior of the support structure.

To enable the apparatus to be towed by a tractor 13 while leaving the front of the apparatus unobstructed, an offset towing rig 14 is provided. This rig 14 includes a transverse bar 15 which is rigidly connected to the ring 5 and, in use, can be coupled to the tractor in a manner such that the bar 15 remains orientated transversely of the tractor centre line. In an alternative arrangement, the bar 15 may extend forwardly as well as transversely (for example, at an angle of 45°).

Turning now to the sheath holding or support means carried by the ring 5, this comprises a suitable number of cranks 20, for example six, distributed uniformly around the periphery of the ring.

Each crank 20 comprises a rod-like mounting portion 21 extending parallel to the axis of the ring 5 and journalled in a fitting 22 secured to the outer edge of the ring. An intermediate portion 24 extends in the release or loading position illustrated in FIG. 1 generally radially inwardly of the ring 5, on its downstream side (having regard to the direction indicated by the arrow A). From the free inner end of the intermediate portion 24, a rod-like support portion 25 extends parallel to the first or mounting portion for a length sufficient to support the plastics sheath.

The intermediate portions 24 of the cranks extend outwardly from the mounting portions 21 and are pivotally connected to links 26 which extend to like pivotal connections with adjacent cranks 20. The links 26 thus form a series of links interconnecting all the cranks 20, which series may extend entirely around the ring 5.

Figure 1:
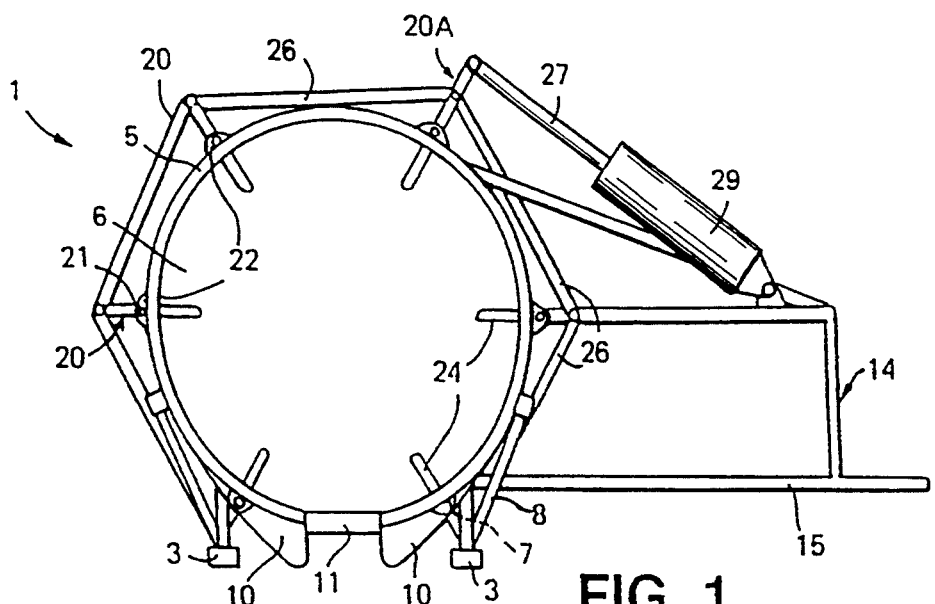
FIG. 1 is a front view of a first apparatus in accordance with the invention.
Figure 3:
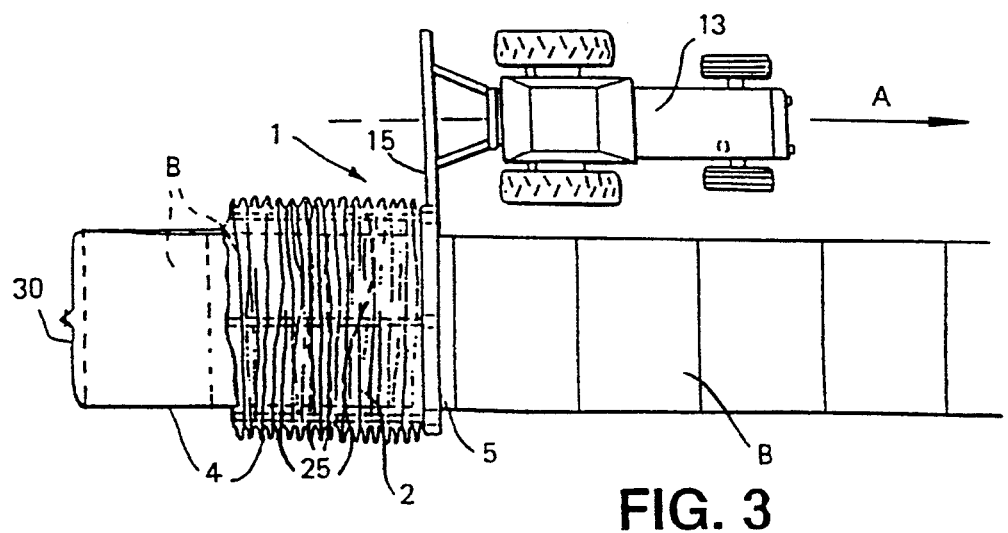
FIG. 3 is a plan view of the apparatus of FIGS. 1 and 2 again shown in use and with parts omitted.

Movement of the cranks 20 is effected by means shown in FIG. 1 but omitted from FIGS. 2 and 3 for the sake of clarity. One of the cranks 20A has an intermediate portion 24 extending outwardly beyond the pivotal connection with the links 26 to a pivotal connection with the piston rod 27 of an hydraulic ram of which the cylinder 29 is pivotally connected to the towing rig 14. By extending and contracting the hydraulic ram, the cranks 20 can be pivoted about the axes of the mounting portions 21 on the support ring 5 so as to alter the position radially of the support portions 25, this movement being conveyed from the crank 20A to the other cranks by the links 26, so that all the cranks move uniformly together in the same direction.

Operation of the apparatus is described below. Initially, the hydraulic ram 27,29 is moved, if necessary, to its contracted position, corresponding to the radially innermost position of the support portions 25 of the cranks 20. The tubular sheath 4, in an axially contracted condition is then placed on the support portions 25 and the rear end of the sheath is closed to form a sealed end 30 at the free ends of the support positions. The unstressed diameter of the sheath, typically 1.14 meters (45 inches), is such that it can be received on the support portions 25 in this position without stretching, so that the preferred axial contraction can be conveniently ensured. As much as 80 m of sheath can normally be accommodated on the support portions 25.

The hydraulic ram is then extended so as to move the support portions 25 outwardly. This outward movement stretches the wall of the sheath 4, so as to increase its peripheral extent. The final outward position of the support portions 25, shown in FIG. 2, corresponds at least approximately to a stretched condition of the sheath wall in which it forms, in effect, a continuation of the support ring 5. A sheath having an unstressed diameter of 1.14 meters can be expanded to a diameter of about 1.52 meters (60 inches) to accommodate a bale of 1.22 meters.

In order to sheath a row of large round bales B, the apparatus is aligned with one end of the row. The tractor 13 can then be advanced in the direction of arrow A to move the blades 10 beneath the first bale B, causing the latter to be lifted up through the mouth of the ring 5 and into the space between the crank support portions and then into the interior of the stretched and axially contracted sheath.

As the tractor 13 continues its advance, the blades 10 engage beneath the second bale B and raise this bale up towards the ring mouth, the first bale B being pushed by the second along the crank support portions. With the subsequent passage of the third bale B up the blades 10, the first bale B is pushed outwardly beyond the ends of the support portions. The bale B then engages the sealed end of the sheath 4 and causes some of the sheath to be drawn off the crank support portions. The portion of the sheath 4 drawn off in this way is pulled out to its full axial extent and also resiliently contracts around the bale so as to engage and slightly compress it. It is of course the bunched-up sheath which moves about the bale B rather than vice versa and the first bale is deposited back on the ground within the sheath when it has emerged from between the support portions.

This first bale B thereafter serves as an anchor for the sheath 4 so that as the apparatus moves away from the first bale, a corresponding length of sheath is pulled off to contract around the second, third and subsequent bales as these in turn pass through the space between the crank support portions to be deposited back on the ground, tightly enclosed by the sheath 4.

All the bales B of the row are thus sheathed in a single continuous operation. The last bale in a row, or an isolated bale, is moved through the apparatus manually or in some other way, as there is no following bale to "push" this bale right through it.

Figure 4:
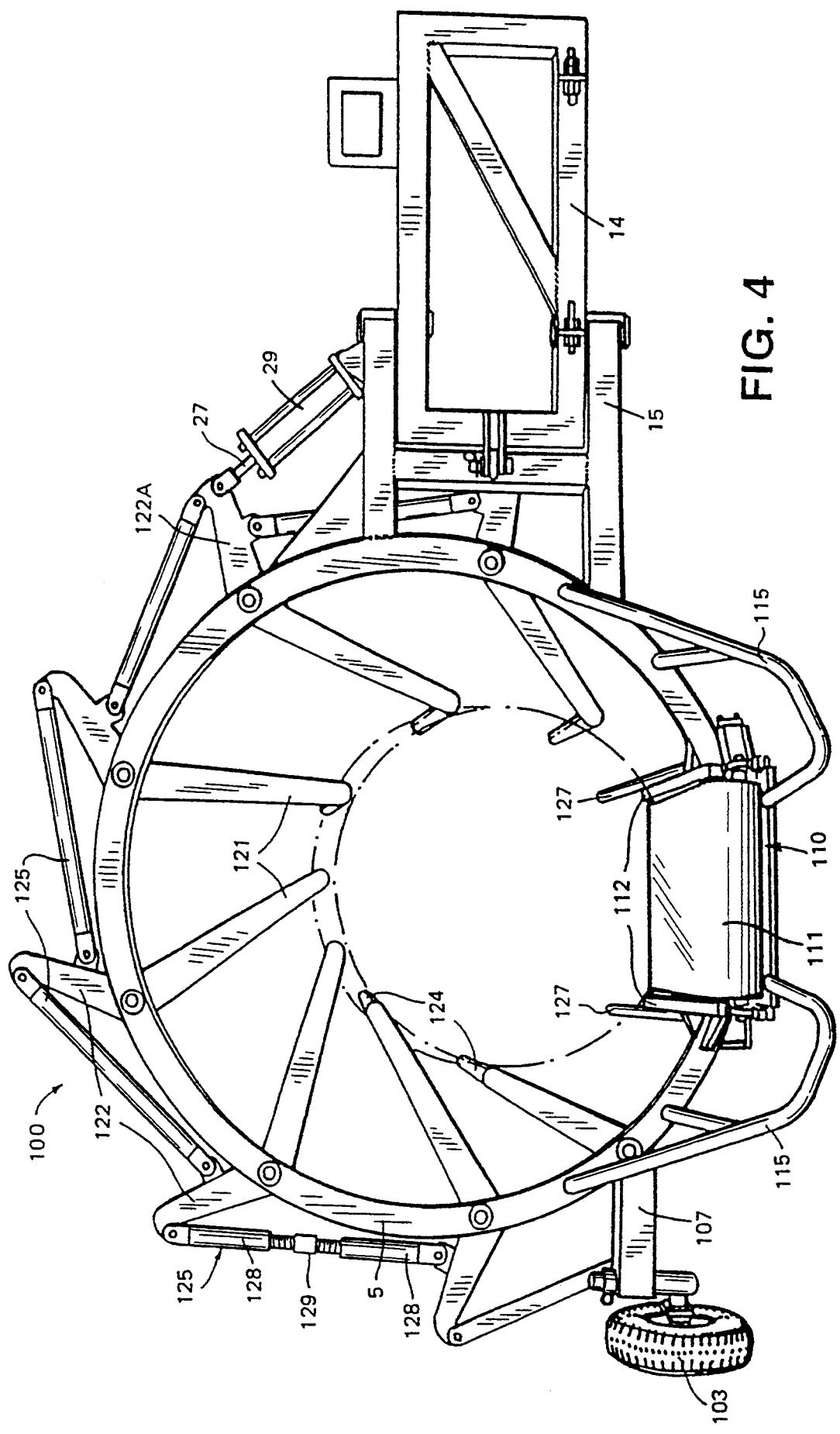
FIGS. 4 & 5 are respectively front and side views of a second apparatus in accordance with the invention.
Figure 5:
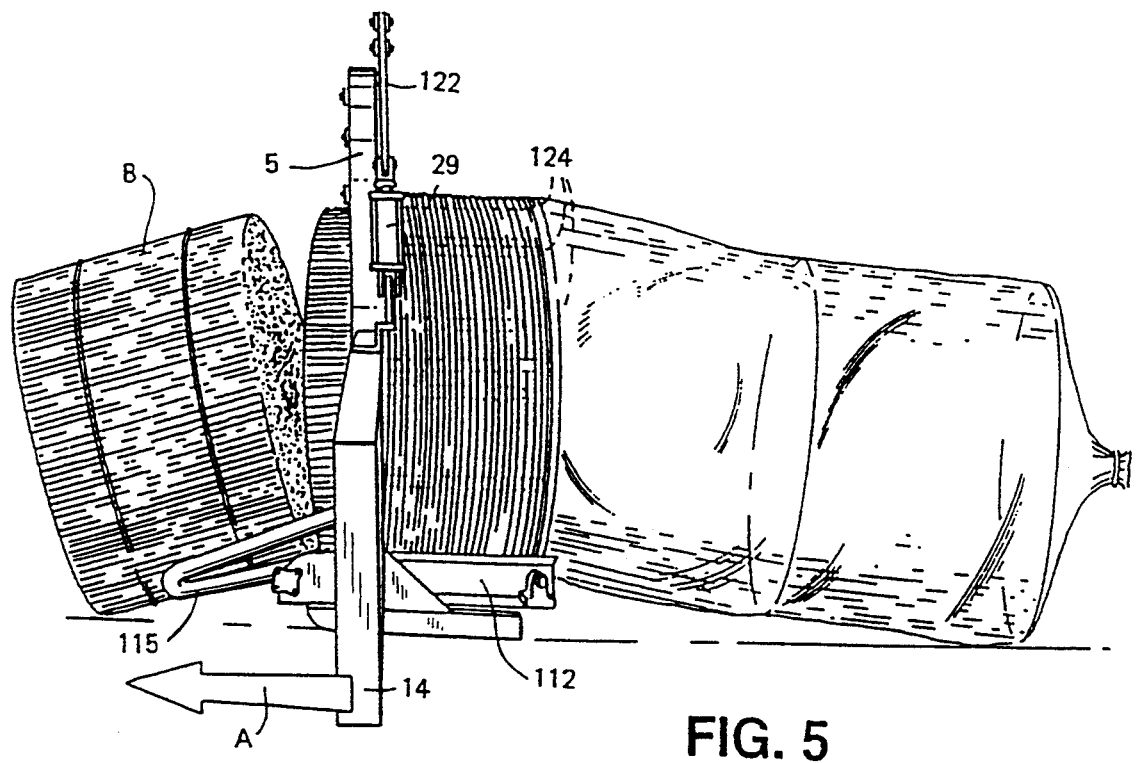
Figure 6:
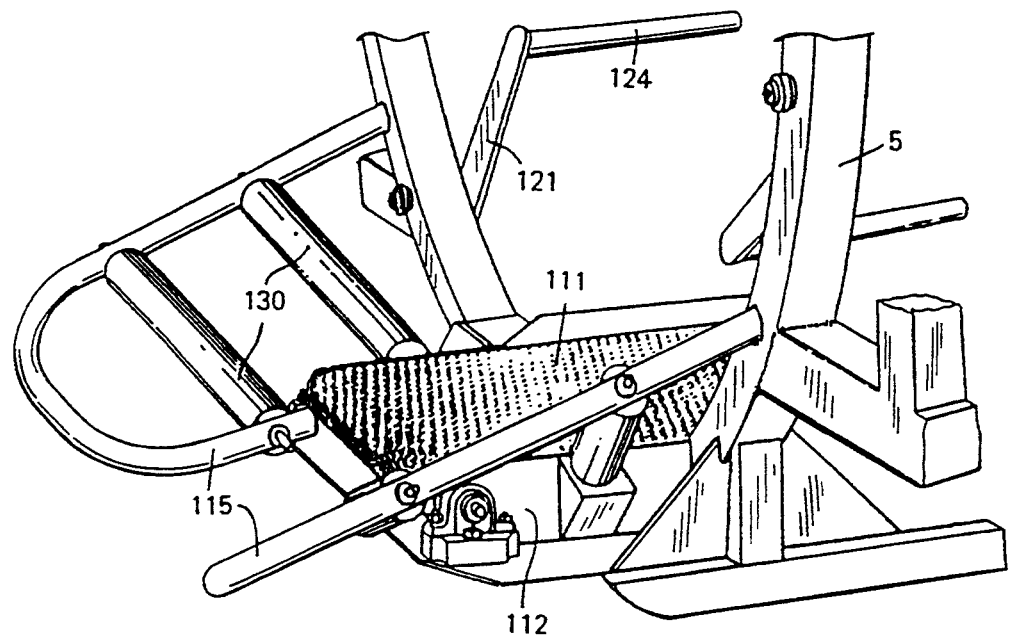
FIG. 6 is a fragmentary perspective view of a modification of the apparatus of FIGS. 4 and 5.

In FIGS. 4-6 the reference signs used in FIGS. 1-3 are used to indicate parts of the second apparatus 100 of the invention which are identical or functionally similar to parts of the first apparatus. Except as described below, the second apparatus 100 corresponds in function and configuration to the apparatus 1.

The second apparatus 100 again has a support structure including a ring 5 supported at one side only by a wheel 103 carried by an arm 107 projecting laterally from the lower region of the ring.

To guide the bales B into a sheath stretched onto the sheath holding means of the apparatus 100, a conveyor 110 extends from a position somewhat forward of the ring 5 to a rear position approximating to the rear end of the sheath holding means. The conveyor has a belt 111 which moves on rollers of which the ends are journalled in spaced parallel bearings 112 extending axially from the base of the ring 5. To provide lateral support for the bales B, frame members 118 extend forwardly from the ring 5 and are bent downwardly and inwardly to terminate just short of the forward roller of the conveyor 110.

The apparatus 100 is also arranged to be advanced by a tractor to which it can be connected by means of the offset towing ring 14. The apparatus is then additionally supported by the wheel 103. When disconnected from the tractor, as shown in FIG. 4, the apparatus rests on the wheel, the frame member 115 and the rear ends of the beams 112.

The sheath holding means of the apparatus 100 again comprises cranks operating similarly to the cranks 20 but comprising arms having inclined inner and outer portions 121 and 122 pivoted to the ring 5 at the join of these portions. A rod-like sheath mounting portion 124 extends axially rearwardly from the inner end of each inner portion 121 and a link 125 is pivotally connected to the outer end of the outer portion 122. The link 125 extends to a pivotal connection to the next outer portion 122 in the direction away from the hydraulic ram, the piston rod 27 of which is pivotably connected to the outer end of the adjacent centre portion 122A. To prevent the sheath end from being stretched in a straight line between the two lowermost portions 124 above the conveyor, a fixed shaft 127 extends parallel to the portions on each side of the conveyor and is received within the sheath together with the portions 124.

The sheath holding means of the apparatus 100 can include means for individual adjustment of the relative positions of the mounting portions 124 and/or adjustment of all the portions 124 to accommodate sheaths of different diameter. Both such adjustments can be provided for by making the lengths of the links 25 selectively variable. Conveniently, as shown at the lefthand side of FIG. 4, each link can comprise two tubular end portions 128 having tapped adjacent end portions connected by an intermediate portion 129 threaded so that the portions 128 are drawn together or spaced apart by rotation of the threaded portion.

In the modification shown in FIG. 6, each of the frame members 115 mounts two spaced rollers 130 about rotational axes which are parallel and inclined downwards and inwardly so that the four rollers constitute a roller conveyance of V-shaped cross-section extending rearwardly from just forwardly of the conveyor 110 to just forwardly of the ring 5.

Various modifications to the apparatus described are, of course, possible. For example, the apparatus can be provided with a power drive for the input rollers or conveyor, or can be made self-propelled rather than tractor-drawn. Different forms of the holding device for the sheath can be employed.

I claim:

1. A method of storing sheathed bales of agricultural crop material on the ground, said bales each being of large size and heavy weight and having varying cross sectional configurations within a determined range of cross sectional dimensions, said method comprising:

providing an elastic tubular bag having an opening therethrough dimensioned in a relaxed state to be no greater than the smallest cross section of said bales, and in an elastically expanded state to be substantially greater than the largest cross section of said bales;

providing a mobile sheathing machine movable along the ground in a defined forward direction, a ring like frame mounted on said machine defining an opening therethrough with an axis through the opening directed along the line of movement of said machine, elongated support rods movably mounted to the frame for radially directed movement inwardly and outwardly from said axis, and a power source for powered movement of said support rods between inner and outer positions, said support rods extended rearward of said ring like frame and collectively defining an opening at their inner position that is smaller than the opening of said bag in its relaxed state and defining an opening in their outer position that is larger than the cross sectional dimension of the largest bale to be stored; and gathering the tubular bag lengthwise to fit onto the length of the elongated support rods, moving the support rods to the inner position, mounting the tubular bag onto the support rods with the rearward most end of the bag being closed, moving the support rods to their outer position and in the process expanding the opening through the bag, inserting the bales in sequence through the frame, through the defined opening of the support rods and into the bag opening for deposit thereof onto the ground rearward of the machine, and in the process pulling a portion of the bag off the support rods which portion contracts around the bale, and in the process moving said machine forward to achieve contiguous and stationary depositing of the bales onto the ground.

2. A method as defined in claim 1 which includes providing a bale receiving and bale guiding portion on said machine and said portion receiving in sequence bales for storage, and guiding said bales for inserting the bales in sequence through the frame.

3. A method as defined in claim 2 which includes aligning the bales in sequence on the ground and said bale receiving and bale guiding portion configured for receiving and guiding said bales as the machine is moved forward.

4. A method as defined in claim 3 which includes providing a tractor and using the tractor for forcibly moving the machine along the aligned bales to sequentially engage, bag, and redeposit the bagged bales on the ground.

5. A system for storing sheathed bales of agricultural crop material on the ground, said bales each being of large size and heavy weight and having varying cross sectional configurations within a determined range of cross sectional dimensions, said bales being sheathed in an elastic tubular bag having an opening therethrough dimensioned in a relaxed state to be no greater than the smallest cross section of said bales, and in an elastically expanded state to be substantially greater than the largest cross section of said bale, said system comprising:

a mobile machine movable along the ground in a defined forward direction, a ring like frame mounted on said machine defining an opening therethrough with an axis through the opening directed along the line of movement of said machine, elongated support rods movably mounted to the frame for radially directed movement inwardly and outwardly from said axis, and a power source for powered movement of said support rods between inner and outer positions, said support rods attached at a front end to the frame and having a free rear end extended rearward of said frame, said support rods collectively defining an opening at their inner position that is smaller than the opening of said bag in its relaxed state and defining an opening in the outer position that is larger than the cross sectional dimension of the largest bale to be sheathed;

said tubular bag being gathered lengthwise to fit the length of the elongated support rods and in the gathered condition fitted to the support rods with the support rods at the inner position, and said gathered tubular bag stretched by the movement of the support rods to their outer position; and said tubular bag provided with a closed rearward end and said bales upon being inserted into the bags and through the openings defined by the support rods being deposited at a stationary position in a sheathed condition on the ground rearward of the machine, said machine being moved forward incrementally as determined by the bale bagging procedure to provide contiguous and stationary placement of the sheathed bales onto the ground.

6. A system as defined in claim 5 including a bale receiving and bale guiding portion on said machine for guiding said bales into and through the frame.

7. A system as defined in claim 6 wherein said portion is configured for engaging and receiving bales as the machine is moved forward.

8. A system as defined in claim 7 including a tractor, said tractor coupled to said machine for pulling said machine along the ground to engage and guide bales from the ground into and through the frame.

* * * * *